United States Patent [19]
Ariyavisitakul et al.

[11] Patent Number: 5,936,754
[45] Date of Patent: Aug. 10, 1999

[54] TRANSMISSION OF CDMA SIGNALS OVER AN ANALOG OPTICAL LINK

[75] Inventors: Sirikiat Ariyavisitakul, Tinton Falls; Sheryl Leigh Woodward, Holmdel, both of N.J.

[73] Assignee: AT&T Corp., Middletown, N.J.

[21] Appl. No.: 08/756,929

[22] Filed: Dec. 2, 1996

[51] Int. Cl.⁶ .................................................. H04B 10/12
[52] U.S. Cl. ...................... 359/145; 359/136; 359/173; 359/143; 359/179
[58] Field of Search .................................... 359/124, 127, 359/143, 145, 125, 179, 173, 172, 136

[56] References Cited

U.S. PATENT DOCUMENTS

| | | | |
|---|---|---|---|
| Re. 35,736 | 2/1998 | Powell et al. | 359/145 |
| 4,545,075 | 10/1985 | Miller et al. | 359/145 |
| 5,305,133 | 4/1994 | Cooper et al. | 359/152 |
| 5,373,385 | 12/1994 | Darcie et al. | 359/162 |
| 5,422,752 | 6/1995 | Hardcastle | 359/183 |
| 5,424,864 | 6/1995 | Emura | 359/173 |
| 5,469,115 | 11/1995 | Peterzell et al. | 330/129 |
| 5,479,595 | 12/1995 | Israelsson | 359/145 |
| 5,493,436 | 2/1996 | Karasawa et al. | 359/145 |
| 5,513,029 | 4/1996 | Roberts | 359/177 |
| 5,655,220 | 8/1997 | Weiland et al. | 455/69 |
| 5,675,429 | 10/1997 | Henmi et al. | 359/179 |
| 5,689,355 | 11/1997 | Okubo et al. | 359/179 |

OTHER PUBLICATIONS

"Digital Cellular In The Fiber–Optic Access Network", Vincent O'Byrne, Optical Fiber Communication Conference, 1992 Technical Digest Series, vol. 5, Conference Edition, Feb. 2–7, 1992, San Jose, California, pp. 83–84.

"Optical Fiber–Based Microcellular Systems: An Overview", W. I. Way, IEICE Trans. Commun., vol. E76–B, No. 9, Sep. 1993, 1091–1102.

"Fiber Optic Microcellular Radio", T. Chu and M. J. Gans, IEEE Transactions on Vehicular Technology, vol. 40, No. 3, Aug. 1991, pp. 599–606.

"Performance of Simulcast Wireless Techniques for Personal Communication Systems", S. Ariyavisitakul et al, IEEE Journal on Selected Areas In Communications, vol. 14, No. 4, May 1996, pp. 632–643.

Newton's Telecom Dictionary, Harry Newton pp. 204–205, Nov. 1994.

*Primary Examiner*—Leslie Pascal

[57] ABSTRACT

A transmission system for backhauling CDMA signals from remote antennas to the centralized base station of a wireless communication system includes a laser transmitter and an optical receiver coupled to an optical fiber. Wireless signals are backhauled to the central base station without degrading signal quality, and with minimal signal processing performed at the remote antenna site. The RF drive current driving the laser transmitter is kept above a predetermined level to prevent noise caused by optical feedback into the laser transmitter caused by Rayleigh backscatter in the optical fiber. A method of testing the optical link is presented which avoids the expense of using a real CDMA system to test each link. The testing method enables the dynamic range of inexpensive, unisolated, uncooled lasers in the optical link to be increased so the optical link can cost-effectively backhaul the CDMA signals.

21 Claims, 7 Drawing Sheets

TRANSMISSION OF CDMA SIGNALS OVER AN ANALOG OPTICAL LINK

FIELD OF THE INVENTION

This invention relates generally to wireless communication systems, and more particularly to transporting code-division-multiple access (CDMA) signals over an analog optical link in a wireless communication system.

BACKGROUND OF THE INVENTION

In order to meet the soaring demand for cellular telephony, including personal communication services (PCS), the capacity of these systems must be increased. The ability to transport analog signals from remote antennas to a centralized base station over fiber or fiber/coax cable would enable systems to share base station resources among many small cells. Cell size could then be reduced in a more cost-effective manner, which would lead to traffic capacity improvements.

Previous attempts have led to the development of a transmission system carrying signals to and from the base station of a wireless communications system to a remote antenna unit, wherein the transmission system could be a cable television (CATV) system, an optical link, or a wireless link. Virtually no signal processing is performed in such a remote antenna unit. Some filtering and amplification is all that is done before the signal is transmitted to the base station. Such an optical transmission system uses high performance transmitters, such as YAG lasers followed by external modulators, or high-performance distributed feedback (DFB) lasers. These type of systems are discussed in the article entitled "Fiber Optic Microcellular Radio" by Chu et al., *IEEE Transactions On Vehicular Technology*, Vol. 40, No. 3, pp. 599–606, August 1991; and in the article entitled "Optical Fiber-Based Microcellular Systems: An Overview" by Way, *IEICE Trans. Commun.*, Vol. E76-B, No.9, pp. 1091–1102, September 1993.

The code division multiple access (CDMA) wireless standard, IS-95, uses spread spectrum techniques to share the available spectrum among many users. In the CDMA system multiple users transmit in the same RF channel (the same frequency band) simultaneously. This is done using a spread-spectrum technique in which each user's signal is modulated with a unique pseudo-random binary sequence (PRBS), spreading the 9.6 kbps signal over a 1.25 MHz radio frequency (RF) channel. In the IS-95 standard, the RF channel uses quadrature-phase-shift-keying (QPSK). Upon reception a correlator is used to separate the signals from multiple users; the correlator despreads only the desired signal. In an IS-95 CDMA system the uplink is fundamentally different from the downlink. The uplink is the RF channel from the user's mobile handset to the base station's antenna, the downlink is from the base station antenna to the mobile handset.

On the uplink, the RF channel is made of simultaneous voice channels originating from the users randomly distributed throughout a cell. Due to synchronization difficulties, incoherent demodulation must be used, and the codes used to spread the signals are not orthogonal. Because the codes from different users are not orthogonal, after despreading the signals from other users appear as noise, and therefore, power control is necessary on the uplink. Without stringent power control to ensure that the signal strength at the receiver is the same from all users, the weaker signals would be impaired by interference from other users within the same cell (i.e., the near-far problem).

In the downlink the entire RF channel originates from the same point, so all the signals can be synchronous. Therefore orthogonal coding can be used in spreading the signals, and the user's handset receiver can use coherent detection of the RF signal. In order to enable users to gain access to the RF channel, the downlink must also transmit control signals. From the control signals the mobile user's handset can derive the code of the access channel and synchronize its signal with that of the base station. Since the uplink and downlink use different radio link techniques, the requirements for backhauling the signals (i.e., transmitting the signals between the remote antenna unit and the centralized base station) will also differ.

The use of inexpensive Fabry-Perot (FP) lasers with CDMA signals is discussed in the article entitled "Digital Cellular In The Fiber-Optic Access Network" by O'Byrne, *Optical Fiber Conference '96 Technical Digest*, TuN5, pp. 83–84, February 1992, which speculates that a carrier-to-noise ratio ("CNR") of −15 dB would be sufficient, but actual implementations based on this assumption are unknown.

SUMMARY OF THE INVENTION

An advance in the art is provided by a transmission system for use in backhauling CDMA signals from remote antennas to the centralized base station of a wireless communication system. According to the invention, wireless signals are backhauled to the central base station without degrading signal quality, and with minimal signal processing performed at the remote antenna site. This is achieved by controlling the RF drive on the laser transmitter in an analog optical link to be above a predetermined level using automatic gain control (AGC) or by adding an out-of-band tone to the optical laser transmitter of the link.

A method of testing the backhauled channel is presented which avoids the expense of using a real CDMA system to test each link. The testing method according to the principles of the invention enables the dynamic range of inexpensive, unisolated, uncooled lasers in the optical link to be increased so the optical link can cost-effectively backhaul the CDMA signals.

The signals to be transmitted from the remote antenna to the mobile unit are sent from the base station to the appropriate remote antenna unit (RAU) via the analog optical link. The signals originating at the base station are coupled to an electronic automatic gain control (AGC) circuit which insures that when RF signals are being transmitted from the optical laser transmitter into the optical link, the RF drive (i.e., the non-DC component of the electric current) on the optical laser transmitter is held above some predetermined level. Holding the RF drive above this predetermined level eliminates noise which might otherwise be present in an optical link using an unisolated laser. An optical receiver in the RAU receives these signals, and amplifies them. The transmit signal passes through a diplexor to the antenna and is then broadcast over the air from the remote antenna unit to the mobile unit.

Signals transmitted from the mobile unit are received at the RAU. The mobile unit's signals are amplified to a predetermined level by an amplifier in the RAU. The amplified signals are used to modulate the optical laser transmitter. Another electronic AGC circuit can be used to control the RF drive on the optical laser transmitter in the RAU. The modulated light from the optical laser transmitter then travels through the analog optical link to the base station where it is received at an optical receiver.

In another embodiment of the invention, the signals to be transmitted from the base station to the mobile unit are added to a different, out-of-band signal so that the RF drive on the optical laser transmitter in the base station is held above some predetermined level for better transmission of the laser signals through the analog optical link. An optical receiver in the RAU receives these laser signals from the analog optical link, and the laser signals are amplified. The out-of-band signal is filtered out of the information-band signals in the RAU. The information-band signals from the base station are then broadcast from the RAU over the air to the mobile unit.

In the transmission system for use in carrying CDMA signals between the central base station of a wireless communication system and the appropriate remote antenna unit as taught herein, the dynamic range of the uplink is designed to meet or exceed the dynamic range of the downlink. Relaxing the specification on the downlink in the transmission system according to an aspect of the invention is important because the optics may be carrying other traffic, in which case it is likely that the optics carrying the downlink will be carrying more non-wireless traffic than the uplink.

Other features and advantages of the invention will become apparent from the following detailed description taken in conjunction with the accompanying drawing, which illustrate, by way of example, the features of the invention.

DETAILED DESCRIPTION

In a traditional wireless communication system, the base station and its antenna are co-located. Signals from the base station travel a short distance to the antenna via coaxial cable. Because the antenna and the base station are co-located, either the base station's antenna is located on top of a tall tower and emits a large amount of power so that each base station serves a large area, or costly base stations are deployed in each small serving area. The invention provides a transmission system for backhauling CDMA signals from a remote antenna unit to the centralized base station, which includes an analog optical link which can backhaul the CDMA signals without degrading signal quality, and with minimal signal processing performed at the remote antenna site so that base station resources can be shared among many small cells.

Figure 1:
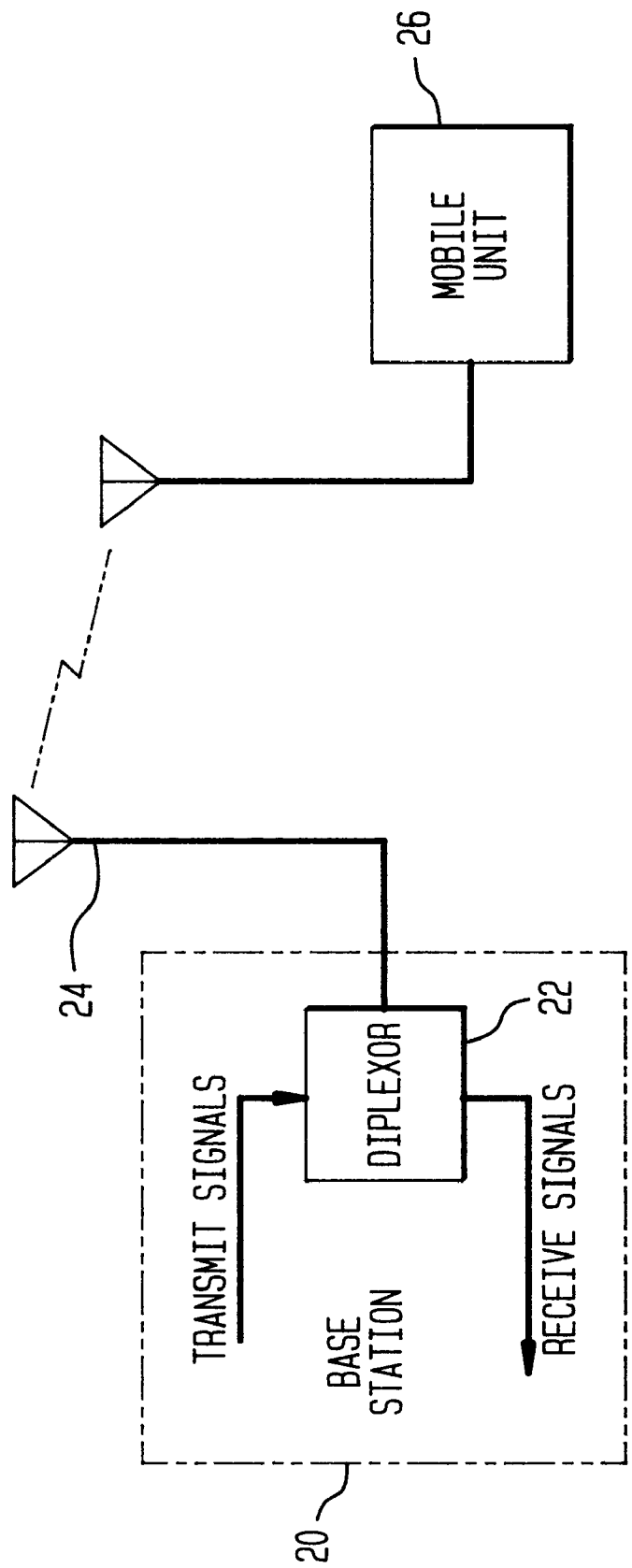
FIG. 1 shows a traditional wireless communication system.

Referring to FIG. 1, a traditional wireless communication system includes a base station 20 which can transmit and receive signals. The base station includes a diplexor 22. The diplexor component has a frequency dependent operation. The diplexor includes a set of filters, and can separate signals in one band from signals in another band. A base station antenna 24 is coupled to the base station 20. A mobile unit 26 communicates with the base station 20 through the base station antenna 24. The diplexor 22 enables signals from the base station 20 and signals from mobile units to be separated from the base station antenna 24. Typically, in a traditional arrangement the base station 20 and the base station antenna 24 are co-located. Signals to be transmitted from the base station 20 to the mobile unit 26 travel a very short distance to the base station antenna 24 through coaxial cable. Because the antenna and the base station are co-located, either the base station's antenna is located on top of a tall tower and emits a large amount of power so that each base station can serve a large area; or costly base stations are deployed in each small serving area.

When using an unisolated laser coupled into an optical fiber we have found that over a large range of drive levels the noise is not purely gaussian but has a strong impulse component. The impulses are caused by optical feedback in the laser caused by Rayleigh backscatter from the optical fiber. These impulses disappear when the laser's modulation depth is increased beyond a certain level. The broadening of the optical spectrum which occurs when the modulation depth is increased reduces the laser's sensitivity to back-reflections.

Figure 2:
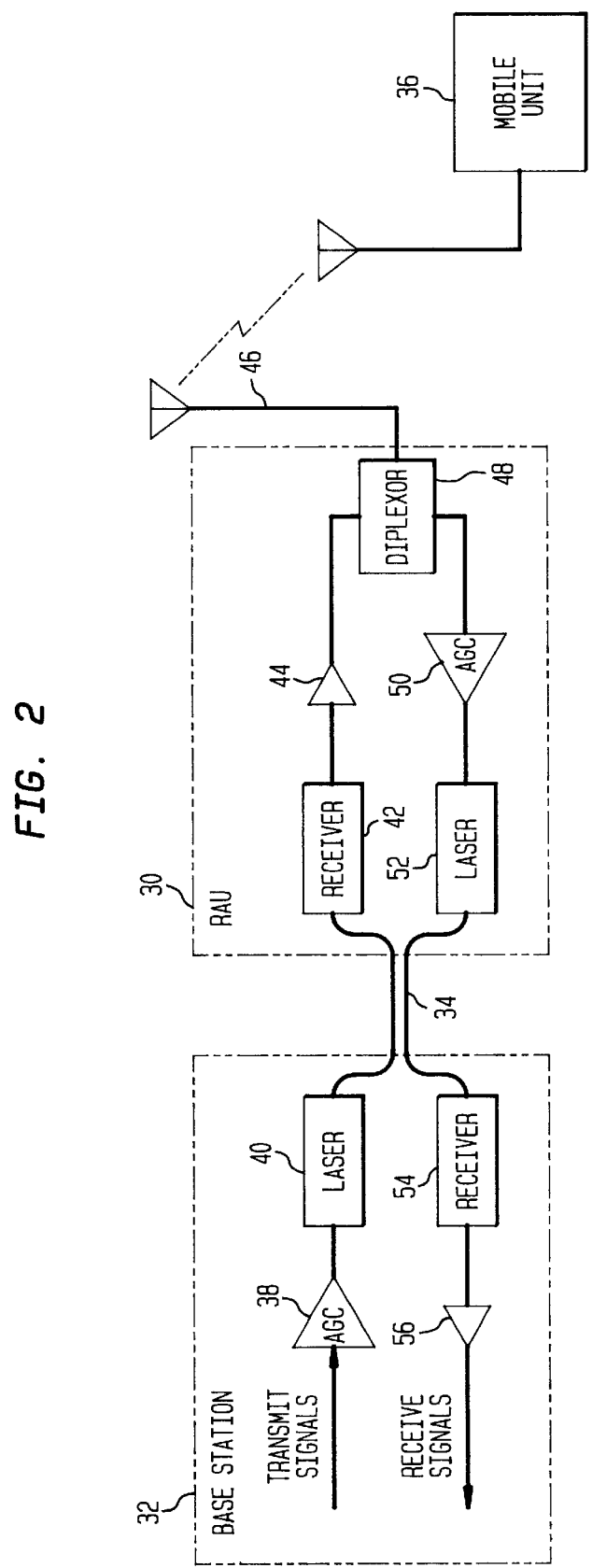
FIG. 2 shows a transmission system for use in a wireless communication system according to an embodiment of the invention.

Referring to FIG. 2, in a wireless communication system configured according to the principles of the invention one or more remote antenna units 30 are communicatively coupled with the centralized base station 32 through a two-way optical coupling which can be one or two optical fibers 34. A mobile unit 36 is wirelessly coupled to the remote antenna unit (RAU) 30. Remote antenna units are deployed throughout the wireless communication system to enable multiple antennas to share a single base station. This enables the cell size that each antenna serves to be reduced without deploying more base stations.

The signals to be transmitted from the remote antenna unit (RAU) 30 to the mobile unit 36 are sent from the base station 32 to the appropriate RAU via the optical fiber 34, which can serve a plurality of remote antenna units. The signals originating at the base station 32 go through a first electronic automatic gain control (AGC) circuit 38. The AGC 38 ensures that when RF signals are being transmitted from the base station 32 into the optical fiber 34, the RF drive (i.e., the non-DC component of the electric current) on the optical laser transmitter 40 at the base station side of the optical fiber 34 is held above some predetermined level. The predetermined level is large enough so that there are no back-reflections due to impulse noise. An optical receiver 42 in the RAU 30 receives these laser signals from the optical fiber 34. An amplifier 44 amplifies the received signals. A second electronic AGC circuit (not shown) at RAU 30 might be used to control the RF drive to the antenna 46. The signal is then broadcast from the antenna 46 coupled to a diplexor 48 into free space for receipt by the mobile unit 36.

Signals from the mobile unit 36 are received at the remote antenna unit (RAU) 30. At the RAU 30, a diplexor 48 separates the incoming received signals from other bands. An amplifier 50 for automatic gain control amplifies the signals from the mobile unit to a predetermined level, which is large enough to prevent back-reflections caused by impulses due to optical feedback in the laser caused by Rayleigh backscatter from the optical fiber. In experimental testing, when the drive level was above −4 dB no impulse noise was present. At 88° C. this drive level corresponds to a root-means-square optical-modulation depth (RMS OMD) of approximately 23%. The amplified signals modulate the optical laser transmitter 52. The modulated light from the laser transmitter 52 then travels from the RAU 30 through the optical fiber 34 to the base station 32. An optical receiver 54 at the base station 32 receives the light. The output of the optical receiver 54 is amplified with an amplifier 56 and is ready for further processing at the base station.

Figure 3:
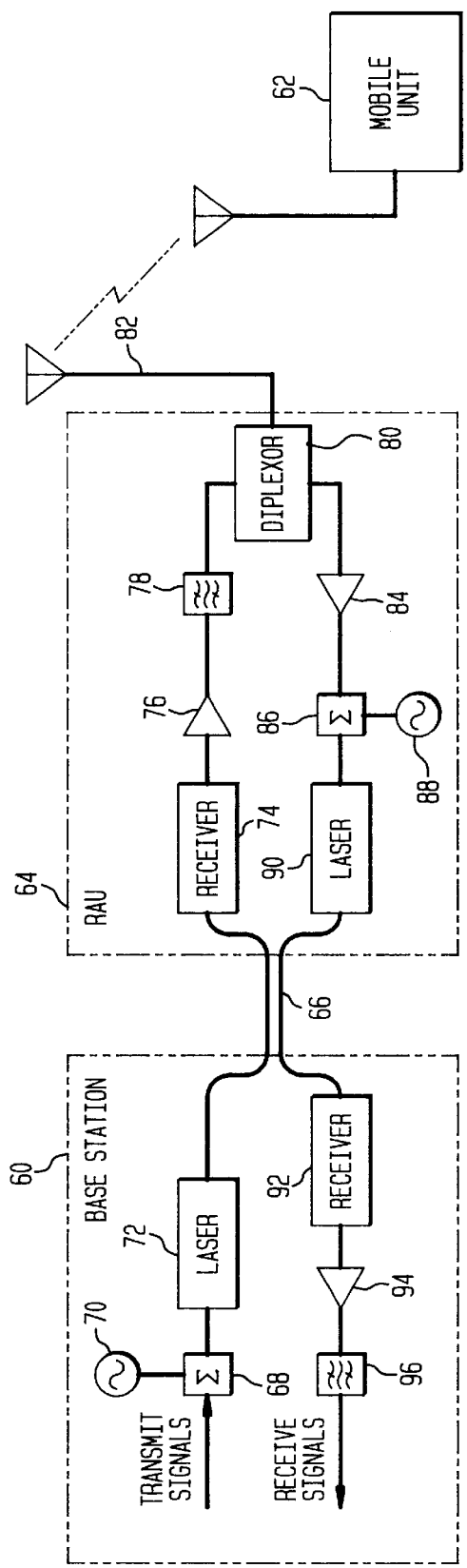
FIG. 3 shows a transmission system for use in a wireless communication system according to another embodiment of the invention.

FIG. 3 shows another embodiment of the invention in which additional signals are added to the RF drive on the optical laser transmitters in the transmission system. Signals to be transmitted from the base station 60 to the mobile unit 62 are sent to the appropriate RAU 64 via a two-way optical coupling which can be one or two optical fibers 66. The information-band signals originating at the base station 60 are added using a summation component 68 to a different, out-of-band signal generated, for example, using a sine wave generator 70 to ensure that the RF drive on the optical laser transmitter 72 in the base station 60 is kept above a predetermined level. The additional out-of-band signal may be one or more tones, a band of noise, or may carry information. The sum of the information-band and out-of-band signals drive the laser transmitter 72 emitting into the optical fiber 66. Signals from the optical fiber 66 are received by an optical receiver 74 coupled thereto. An amplifier 76 amplifies the signals. The out-of-band signal is separated from the information-band signals using a bandpass filter 78. The information-band signal is then coupled through a diplexor 80 to the antenna 82. The signal is then broadcast over the air to the mobile unit 62 using the antenna 82.

Signals from the mobile unit 62 are received at the antenna 82 and coupled into the RAU 64. The diplexor 80 couples the received band of signals to an amplifier 84 in the receiving path in the RAU 64. The amplified information-band signals from the mobile unit 62 are added using a summation component 86 to another, out-of-band signal provided, for example, from a sine wave generator 88 or other source. The out-of-band signal could also be a signal that is not a sine wave. The summation component 86 output signal drives an optical laser transmitter 90 coupled into the optical fiber 66. The out-of-band signal portion of the summed signal output ensures that the RF drive on the optical laser transmitter 90 is held above some preset level to prevent back-reflections due to impulse noise. The modulated light from the laser transmitter 90 coupled into the optical fiber 66 is received at the optical receiver 92 in the base station 60. The received signal is amplified with an amplifier 94. The out-of-band tone is removed from the information-band signals with a bandpass filter 96.

Figure 4:
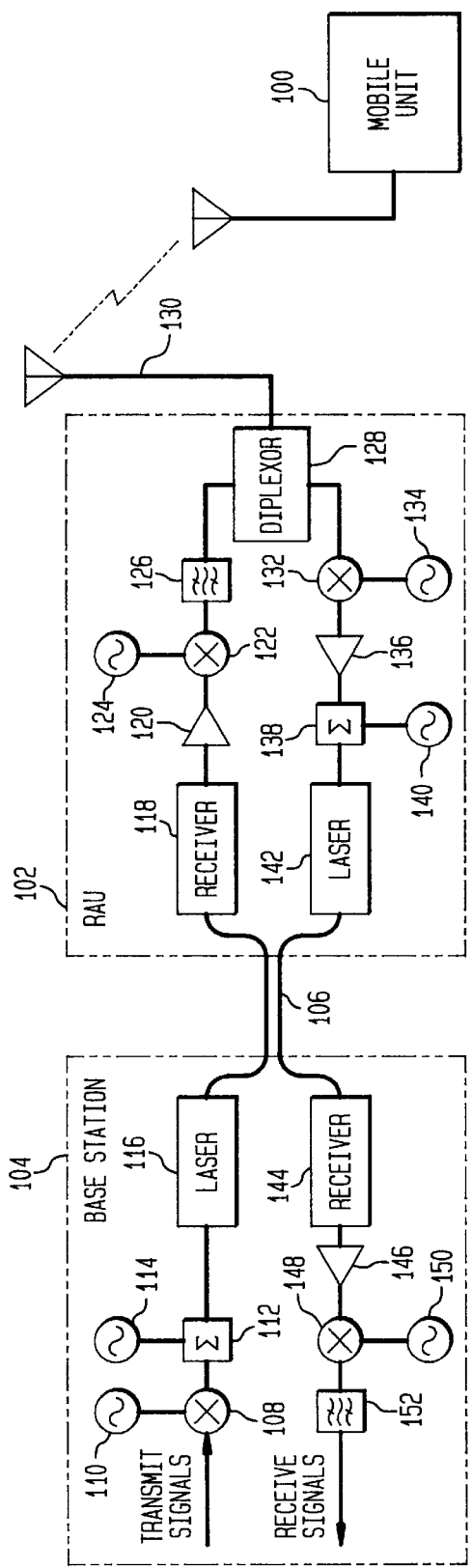
FIG. 4 shows a transmission system for use in a wireless communication system according to yet another embodiment of the invention.

In yet another embodiment of the invention as shown in FIG. 4, frequency conversion facilities have been added to the transmission system in the remote antenna unit and in the base station. This allows for greater flexibility in allocating bandwidth over the optical link, and the wireless link. In the wireless communication system, a plurality of remotely deployed antenna units can be coupled to the centralized base station through the analog optical link of the transmission system. A mobile unit 100 is communicatively coupled to the remote antenna unit 102 through a wireless channel. Signals can be transmitted from the base station 104 through the two-way optical coupling, which can be one or two optical fibers 106, for broadcast to the mobile unit 100. Signals from the mobile unit 100 are received by the base station 104 through the optical fiber 106.

The centralized base station 104 and remote antenna unit 102 launch signals for receipt by the mobile unit 100. Information-band signals are first frequency-converted using a mixer 108 and frequency source 110 facility in the base station. A summation component 112 adds the frequency-converted information-band signals and a different, out-of-band signal provided by a sine wave generator 114 or other means. The out-of-band signal can be one or more tones, a band of noise, or may carry other information. The output of the summation component modulates an optical laser transmitter 116. The out-of-band signal ensures that the RF drive on the laser transmitter 116 is kept above a predetermined level. The modulated laser output from the laser transmitter 116 is input to the optical fiber 106. An optical receiver 118 at the RAU 102 receives the modulated laser signal from the optical fiber. An amplifier 120 coupled to the optical receiver 118 amplifies the received signal. A frequency conversion facility including a mixer 122 and a frequency source 124 coupled to the amplifier 120 converts the frequency (up or down) of the received signal. A bandpass filter 126 coupled to the output of the mixer 122 removes the out-of-band signal and any non-linearities caused by the frequency conversion process. A diplexor 128 is coupled to the output of the bandpass filter 126. The diplexor 128 guides the information-band signals to an antenna 130. The information-band signals are launched into free space using the antenna 130.

Signals arrive at the antenna 130 from the mobile unit 100. The diplexor 128 coupled to the antenna 130 directs information-band signals from the mobile unit 100 into the receive path in the RAU 102. A frequency conversion facility including a mixer 132 and frequency source 134 (e.g., a sine wave generator) is coupled to the diplexor 128. The information-band signals are frequency converted by the frequency conversion facility. An amplifier 136 is coupled to the output of the mixer 132 in the frequency conversion facility to amplify the frequency-converted information-band signals from the diplexor 128. A summation component 138 adds the amplified frequency-converted information-band signals and an out-of-band signal which can, for example, be generated by a sine wave generator 140 so that the RF drive on the optical laser transmitter 142 is kept at a predetermined level. The output of the summation component 138 is coupled to drive the optical laser transmitter 142. The modulated laser signal from the laser transmitter 142 coupled into the optical fiber 106 is received by an optical receiver 144 in the base station 104 coupled to the optical fiber 106. The optical receiver 144 recovers the output of the summation component 138, which is amplified using an amplifier 146. The output of the amplifier 146 is frequency-converted using a facility which includes a mixer 148 and a frequency source 150. The frequency-converted signal is then filtered with a bandpass filter 152 to remove the out-of-band tone and non-linearities therein and is subject to further processing in the base station 104.

In the transmission system for carrying CDMA signals between the base station and the remote antenna unit illustrated by FIGS. 2–4, Fabry-Perot lasers can be used as the optical laser transmitter for the analog optical link at both the base station and remote antenna unit. One or two optical fibers can connect the base station and the remote antenna unit. If only one optical fiber is used, a Fabry-Perot (FP) laser can be used in one direction (e.g., the uplink) and a single-frequency laser, such as a distributed feedback (DFB)

laser or a distributed Bragg reflector (DBR) laser, having a different emission wavelength than the FP laser, is used in the other direction (e.g., the downlink). In such a single-optical fiber embodiment, the emission wavelength of the FP laser should be near the dispersion zero of the optical fiber. The optical laser transmitters can be cooled or uncooled, and can be isolated or unisolated. Additional traffic can be carried through the analog optical fiber link at other RF frequencies or can be carried over the fiber using lasers at other optical wavelengths. The CDMA signals can be transmitted at the same or different frequencies over the air as on the fiber. If the CDMA signals are transmitted at different frequencies over the air and through the optical fiber, respectively, the remote antenna unit and base station include frequency converting facilities.

The dynamic range requirements (DyR) for backhauling CDMA signals are defined in terms of the acceptable input signal range (usually from where the output signal equals the noise to where the distortion equals the noise). The requirements are translated into a simple two-tone test which can be used to evaluate the DyR of a backhaul channel according to the invention. The test results using an unisolated, uncooled Fabry-Perot laser are described subsequently.

The transmission requirements for backhauling the uplink are as follows. The signal-to-interference-plus-noise ratio (SINR) requirement for the IS-95 CDMA uplink is 7 dB after despreading. The spread-spectrum technique gives the channel a 21 dB processing gain (1.25 MHz/9.6 kHz), so that only a SINR=−14 dB is required per voice channel prior to despreading. It has been shown through simulation that to obtain 99% coverage this SINR requirement corresponds to a signal-to-noise ratio (SNR) requirement of 6 dB per user. This simulation included power equalization, voice activity detection and interference from adjacent cells. The simulation randomly located users throughout the service area, and predicted a capacity of 28 Erlangs per cell with 1% blocking. The required DyR is calculated by taking the product of the average number of users, and the required SNR per user. This must then be increased by approximately 5 dB to provide additional headroom, which is necessary to handle statistical fluctuations in the combined signals' amplitude (the envelope of the RF signal will not be constant). This gives a system requirement:

$$DyR_{system}=6 \text{ dB}+10\log_{10}28+5 \text{ dB}=26 \text{ dB} \qquad (Eq. 1)$$

The system noise should not be dominated by the backhaul link, therefore we place a DyR≧36 dB requirement on the backhaul channel.

The transmission requirements for backhauling the downlink are as follows: on the downlink, from the base station to the mobile handset, coherent QPSK demodulation can be used, therefore, the required SINR is only 5 dB after despreading. This corresponds to a SINR requirement of −16 dB per voice channel prior to despreading. To compensate for the variation in signal strength and adjacent cell interference that each user receives, some limited power control is used on the downlink. This power control does not equalize the power assigned to each user, but rather tries to ensure that each user does not get too poor a SINR.

Because orthogonal coding is used on the downlink, ideally the signal power from other users within the same cell will not appear within a user's channel after despreading. In practice, the presence of multipath interference reduces the effectiveness of the orthogonal coding. In addition, users in adjacent cells use spreading codes that are not orthogonal to the codes used in the original cell. Therefore, after despreading, signals from other users will appear as noise. Because the multipath environment can vary greatly, modelling the downlink is difficult, therefore a simple formula is derived according to the invention in order to estimate reasonable DyR requirements.

The DyR required on the backhaul channel to ensure that the $i^{th}$ user has a SINR>−16 dB=1/40 is calculated.

$$(\eta_i S_i)/(I_i+N_{rec'r}+\eta_i N_{ant})>(1/40) \qquad (Eq. 2)$$

where $S_i$ is the power of the $i^{th}$ user's signal at the base station's antenna, $\eta_i$ is the fraction of power emitted from that antenna that is received at the mobile handset, $I_i$ is the interference seen by the $i^{th}$ user, $N_{rec'r}$ is the receiver noise of the handset, and $N_{ant}$ is the noise present at the base station's antenna. The noise in the backhaul channel is included in $N_{ant}$. The interference seen by a user will depend on where in the cell it is located, and the effectiveness of the orthogonal coding.

$$I_i=\alpha_i\eta_i(S_{control}+\Sigma S_j \text{ for } j\neq i)+\Sigma\eta_{ic}P_c \qquad (Eq. 3)$$

where $\alpha_i$ is a measure of the effectiveness of the orthogonal coding at the $i^{th}$ user's location (it may vary from 0 to 1), $S_{control}$ is the power in the pilot and access channels, P is the power emitted from the user's base station, $\eta_{ic}P_c$ is the power received at the mobile unit from neighboring cells. Clearly if $\eta_{ic}P_c>\eta_i P$ the call should be handed off. Assuming that all base stations emit approximately the same total power, P, Eq. 3 simplifies to:

$$I_i\approx k_i\eta_i P \qquad (Eq. 4)$$

So far we have neglected voice activity detection, but clearly it can be included in the factor $k_i$.

Because of power control at the base station, $S_i$ will not be the same for all users, so we define $q_i=S_i/S_{avg}$, and we define $\gamma=S_{control}/P$. Defining the average number of users as M, algebra yields $P=MS_{avg}/(1-\gamma)$. By combining this with Eq. 2 and Eq. 4:

$$(P/N_{ant})>(M\eta_i P/[40(1-\gamma)q_i-Mk_i]\eta_i P-MN_{rec'r}) \qquad (Eq. 5)$$

Because the backhaul channel does not account for all of the noise in $N_{ant}$, and to ensure adequate headroom, the DyR requirement on the backhaul channel should be increased. As was the case with the uplink, the DyR requirement on the backhaul channel is increased by 15 dB.

$$DyR>(M\eta_i P/[40(1-\gamma)q_i-Mk_i]\eta_i P-MN_{rec'r})+15 \text{ dB} \qquad (Eq. 6)$$

To calculate a reasonable DyR requirement consider an exemplary system where the average signal power is $S_{i,avg}=$ 50 mW; power control can vary this by a ±6 dB ($0.25<q_i<4$), and $\gamma=0.2$. We will also assume the user's handsets have $N_{rec'r}=-100$ dBm, and the number of users will be limited by the uplink to M=28. This implies that P=1.75 W. Consider the DyR requirements for three scenarios:

(i) User one is located where there is a moderate amount of interference, $k_1=1$, and the loss is high $\eta_1=-120$ dB. Assuming that $q_1=1$, Eq. 6 yields a requirement that DyR>26 dB to ensure that this user will not be limited by the backhaul channel.

(ii) User two is located close to the antenna, so that both the loss and the interference are low ($k_2$ and $N_{rec'r}/\eta_2$ are negligible). Because the loss is low, it is reasonable to assume that the noise is dominated by $N_{ant}$. The base station's power control will minimize the power sent to a user in such a favorable position, so that $q_2=0.25$. Eq. 6 yields a DyR requirement of DyR>20 dB. (In a real system $q_1$ and $q_2$ would be set to give comparable SNRs.)

(iii) Finally, consider user three, located at a cell boundary where both the loss and the adjacent channel interference are high, $\eta_3=-120$ dB, $k_3=4$). Because this user is in a harsher environment than the cell's other users, the base station can increase his signal's power, therefore assume that $q_3=4$. In this case, we calculate that the DyR must be greater than 18 dB.

For our exemplary system a requirement that DyR>26 dB on the downlink seems reasonable. This is 10 dB below the requirement on the uplink. When the infrastructure backhauling the uplink and downlink is used for other services, this relaxed requirement for transporting the downlink might be important. If the optics used for the downlink need to transport more traffic than is carried on the uplink's optical path, then the CDMA downlink may have a smaller DyR.

Figure 5:
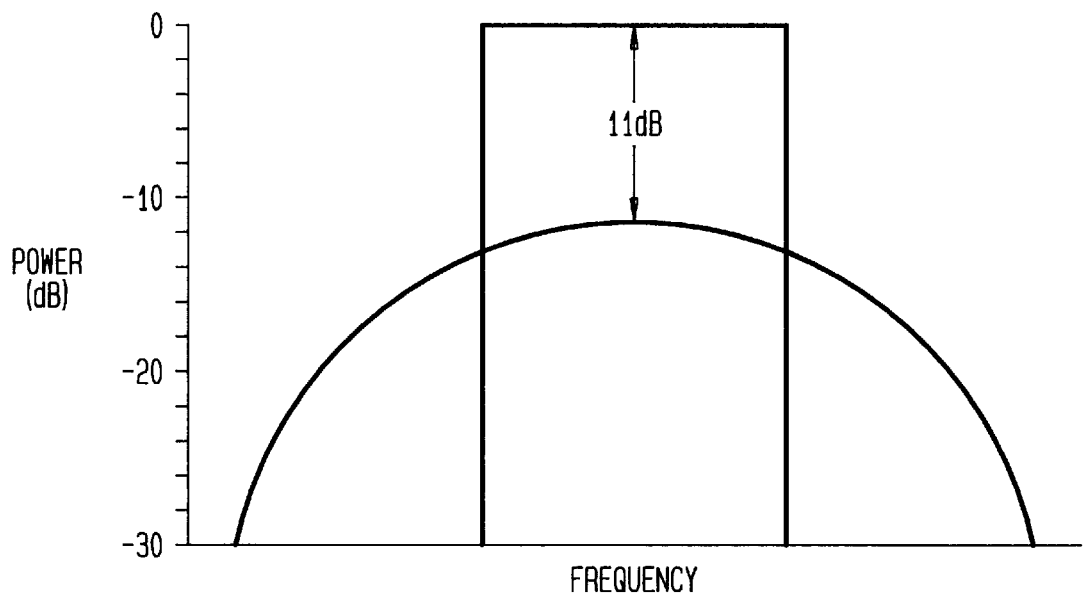
FIG. 5 shows the spectra of the RF channel and the third-order distortion in a CDMA system.
Figure 6:
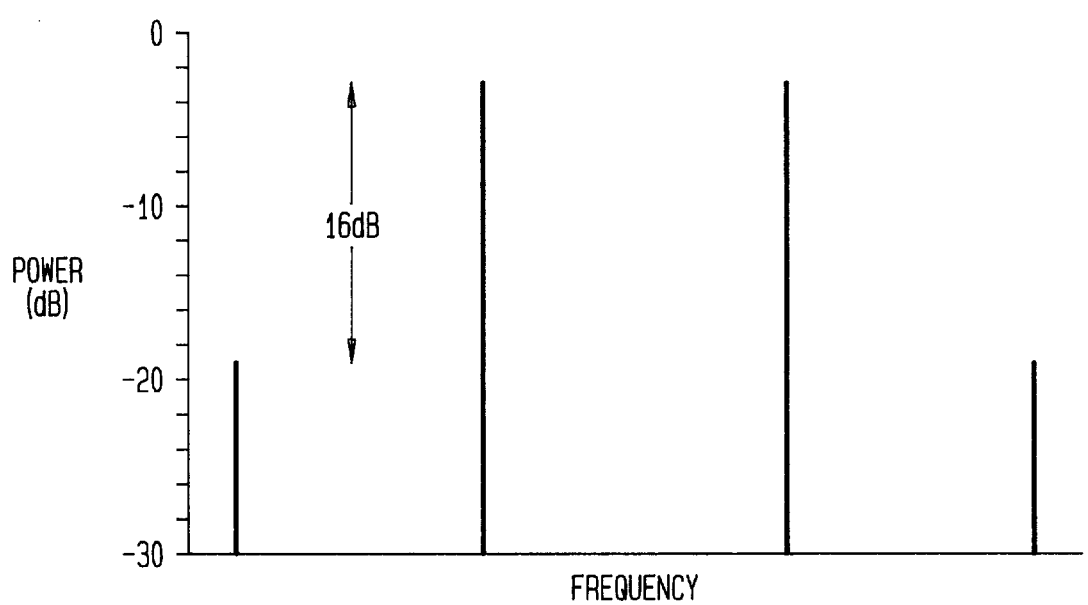
FIG. 6 shows the third-order distortion from two equal strength input tones.

The DyR of the backhaul channel is measured as taught herein using two tones rather than using actual CDMA signals. In a CDMA system the RF channel's spectrum will have a square shape, 1.25 MHz wide, and the third-order distortion will have a gaussian shape, as depicted in FIG. 5. It is difficult to measure the third-order distortion using such a CDMA signal. The SNR and distortion corresponding to a CDMA system can easily be calculated from measurements made with two equal strength tones, as shown in FIG. 6.

$$SNR_{CDMA} = CNR_{2tone}(\text{dB}/1.25 \text{ MHz}) + 3 \text{ dB} \quad \text{(Eq. 7)}$$

The 3 dB correction is because the carrier-to-noise ratio (CNR) is measured relative to the level of one of the two tones, and the signal's energy equals the energy in both tones.

The signal-to-distortion ratio of a CDMA signal ($SDR_{CDMA}$) can also be easily calculated as taught herein from carrier-to-distortion measurement ($CDR_{2tone}$). Assuming that the system is limited by third-order distortion:

$$SDR_{CDMA} = CDR_{2tone} - 5 \text{ dB} \quad \text{(Eq. 8)}$$

This correction was determined by calculating the distortion generated by a signal with a square shape, and comparing it with the calculated distortion from two tones. The total signal power was the same in both cases. The distortion was calculated by convolving the signal with itself.

Noise performance of the wireless transmission system using the analog optical link can be measured according to the invention. The noise and distortion of an uncooled, unisolated, 1.3 $\mu$m Fabry-Perot laser transmitting through 18 km of optical fiber was determined. A rotary splice was used to join the laser's fiber pigtail to the spool of fiber, and care was taken to minimize the reflection from this connection. Measurements were performed at room temperature, and high temperature. At both temperature settings the laser bias was set so that 1 mW was emitted from the fiber pigtail, and the received optical power was −10 dBm. The input drive was varied by adjusting an RF attenuator. The results are presented in FIGS. 7 and 8.

Figure 7:
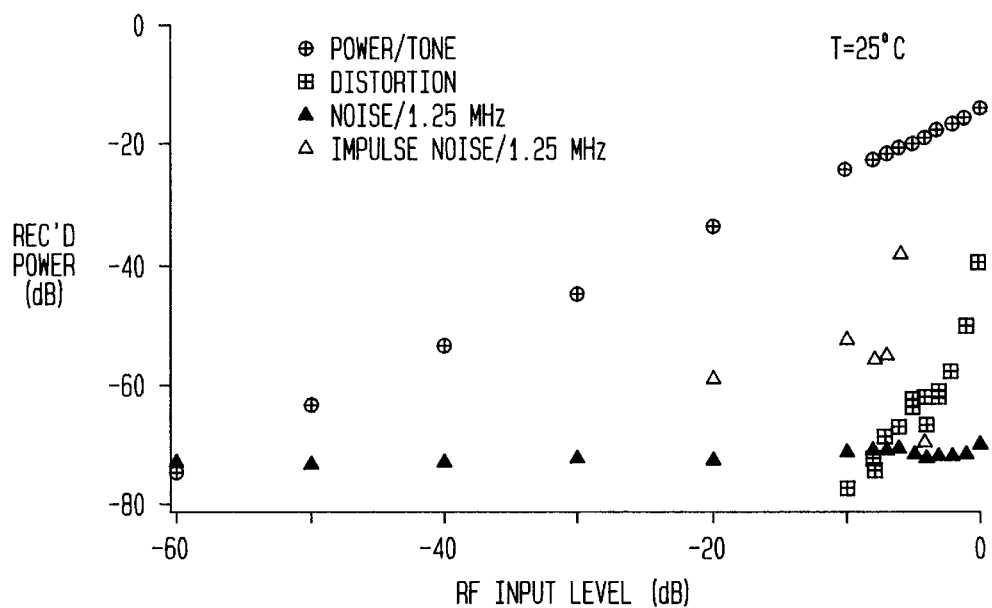
FIGS. 7 and 8 show experimental results from data measured with two tones used to represent the CDMA signal at 25° C. and 88° C., respectively.
Figure 8:
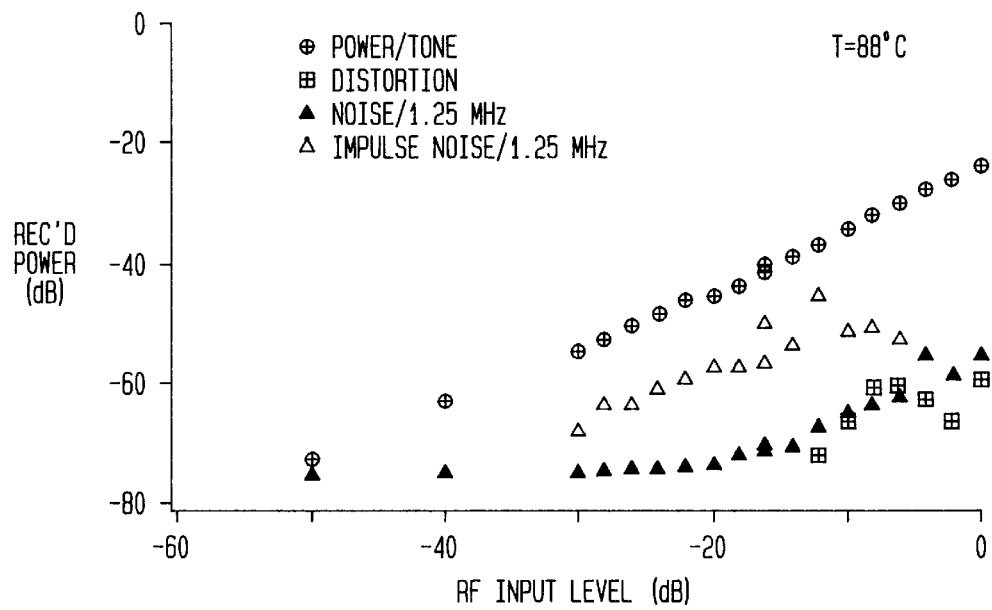

FIGS. 7 and 8 show the power per tone, noise, and distortion as a function of the RF drive level at both room temperature (25° C.) and 88° C. The peak power is lower at high temperature because of the laser's reduced slope efficiency. Over a large range of drive levels the noise is not purely gaussian, but has a strong impulsive component as well. These impulses last approximately 3.2 mS. (In IS-95, interleaving of 20 mS frames can reduce the impact of impulse noise that lasts significantly less than 20 mS, but would probably be insufficient to handle the impulse noise that we observed). These impulses are caused by Rayleigh backscatter in the fiber, and disappeared when the laser's modulation was increased beyond a certain level according to the principles of the invention (see FIGS. 7 and 8). When the drive level was above −4 dB no impulse noise was present in our experiments, at a temperature of 88° C. this drive level corresponds to a root-mean-square opticalmodulation depth (RMS OMD) of approximately 23%. The broadening of the optical spectrum, which occurs when we increase the modulation depth, reduces the laser's sensitivity to back-reflections. Not only did the impulse noise vary as a function of the drive level, another unexpected result was that the laser's relative-intensity noise varied with the input drive level as well.

Techniques for optimizing and controlling the dynamic range of the analog optical link are now described. To maximize the DyR of the optical link the laser should always be driven hard enough so that no impulse noise is present. An automatic gain control circuit can be used on the laser drive in the remote antenna unit so that the laser drive remains at a high level regardless of the traffic load. In this case, we calculate the optimal drive level at room temperature to be −4 dB, which corresponds to an optical modulation depth (OMD) of 44% per tone. With this input drive level the $CDR_{2tone}=44$ dB, which implies that if a CDMA signal were used the $SDR_{CDMA}$ would be 39 dB. At this drive level, the distortion is greater than the noise, and therefore will limit what drive level will be an acceptable minimum. The minimum input drive level is where the output signal level equals the distortion. Because the impulse noise disappears at high drive levels, operating over this range which is limited by distortion rather than by noise gives the maximum DyR. The minimum input level is where $SD_{max}R_{CDMA}=0$ dB, where $SD_{max}R$ is the ratio of the output signal power to the maximum distortion output. This occurs where $CD_{max}R_{2tone}=5$ dB. In FIG. 7 the distortion is −62 dB for an input drive level of −4 dB; the power per tone is 5 dB above this when the input level is −43 dB, yielding DyR=39 dB. With the laser at 25° C. the dynamic range of this optical link is adequate for backhauling the uplink or the downlink of an IS-95 CDMA system with an Erlang capacity of twenty-eight users per cell.

At high temperature the same RF drive level will yield no impulse noise, but the measured $CNR_{2tone}=28$ dB/1.25 MHz, which corresponds to $SNR_{CDMA}=31$ dB. Because the noise level varies with RF drive, the minimal input drive level will not be where the $SNR_{CDMA}=0$ dB, but will be where the output signal equals the maximum noise level observed over the entire operating range: $SN_{max}R_{CDMA}=0$ dB. This occurs at an input level of −33 dB, where $CN_{max}R_{2tone}=-3$ dB. Therefore the DyR of this optical link over the measured temperature range is only 29 dB, and is limited by the laser's performance at high temperature. Using a link with this DyR will reduce the system's capacity.

Figure 9:
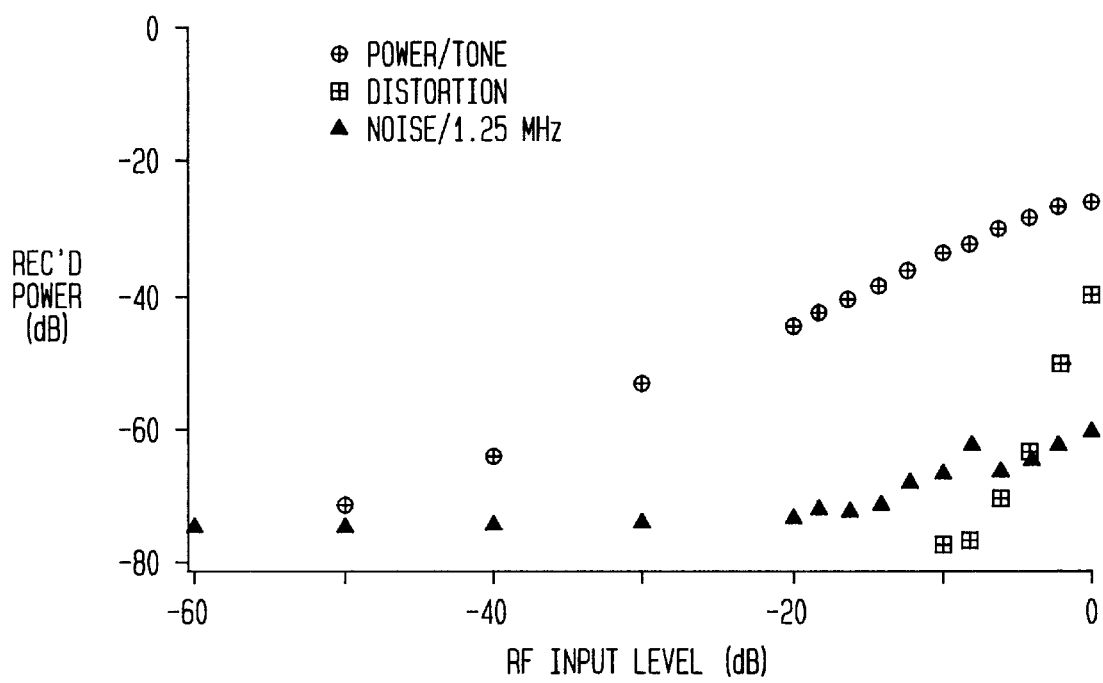
FIG. 9 shows dynamic range measurements taken with an additional RF tone driving the laser at 880 MHz.

An alternate solution to the impulse noise problem is to drive the laser with an out-of-band tone, which eliminates the necessity of automatic gain control. The DyR of this laser, with an additional tone driving the laser at 880 MHz with an OMD=39%, has been measured. Because the laser is always being driven with a large OMD, the impulse noise is never present. The results, taken at 88° C., are presented in FIG. 9. Since both the noise and distortion rise as the RF drive is increased, the optimal maximum RF drive is −10 dB in this case. The minimal drive is where the signal power would equal the maximum noise over the operating range, and corresponds to an input level of −46 dB. Therefore the DyR=36 dB, and meets the uplink requirement specified earlier.

The use of optical isolators is another solution to the impulse noise problem, and may yield better performance than the addition of an out-of-band tone, however, it is currently a more expensive solution.

The requirements for backhauling CDMA signals over an analog optical link have been formulated, and a simple two-tone test has been developed according to the invention to measure the dynamic range of such a link. The dynamic range of an inexpensive, uncooled, unisolated Fabry-Perot laser, which can be used as the optical transmitter in the optical link, is limited by impulse noise caused by back-reflections. This noise is dependent on the laser drive level, and can be eliminated by driving the laser with an additional out-of-band tone. When such a tone is employed, such a Fabry-Perot laser is capable of backhauling a CDMA RF channel in the optical link.

While several particular forms of the invention have be been illustrated and described, it will also be apparent that various modifications can be made without departing from the spirit and scope of the invention.

We claim:

1. A method for backhauling CDMA signals between a centralized base station of a wireless communication system and a remote antenna unit, comprising the following steps:

(A) transmitting CDMA signals at an optical wavelength into an optical fiber connecting the base station and the remote antenna unit using a laser transmitter; and (B) maintaining the RF drive current on the laser transmitter above a level;

wherein the dynamic range of the unlink from the remote antenna unit to the base station exceeds 36 dB, and the dynamic range of the downlink from the base station to the remote antenna unit exceeds 26 dB.

2. A method as defined in claim 1, further comprising the step:

receiving CDMA signals at the optical wavelength from the optical fiber connecting the base station and the remote antenna unit.

3. A method as defined in claim 1, wherein:

the laser transmitter is unisolated.

4. A method as defined in claim 1, wherein step (B) includes the step:

controlling the optical modulation depth of the laser transmitter.

5. A method as defined in claim 1, wherein step (B) includes the step:

using an automatic gain control circuit coupled to the laser transmitter.

6. A method as defined in claim 1, wherein step (B) includes the step:

adding an out-of-band tone to the CDMA signals.

7. A method as defined in claim 1, further comprising the step:

carrying additional traffic at other optical wavelengths over the optical fiber.

8. A method as defined in claim 1, further comprising the step:

broadcasting the CDMA signals into free space from the remote antenna unit.

9. A method as defined in claim 8, wherein:

the CDMA signals are broadcast at the same frequency into free space as on the optical fiber.

10. A transmission system for carrying CDMA signals between a centralized base station of a wireless communication system and a remote antenna unit, comprising:

an optical fiber connecting the base station and the remote antenna unit;

a downlink laser transmitter in the base station coupled to the fiber for transmitting CDMA signals at an optical wavelength;

a downlink optical receiver in the remote antenna unit coupled to the fiber for receiving CDMA signals at the optical wavelength;

an uplink laser transmitter in the remote antenna unit coupled to the fiber for transmitting CDMA signals at the optical wavelength; and an uplink optical receiver in the base station coupled to the fiber for receiving CDMA signals at the optical wavelength; wherein the RF drive current driving each of the uplink and downlink laser transmitters is maintained above a level;

wherein the dynamic range of the transmission system exceeds 36 dB on the unlink from the remote antenna unit to the base station, and exceeds 26 dB on the downlink from the base station to the remote antenna unit.

11. A system as defined in claim 10, wherein:

at least one of the uplink and downlink laser transmitters is a Fabry-Perot laser.

12. A system as defined in claim 11, wherein:

the emission wavelength of the at least one laser transmitter is near the dispersion zero of the optical fiber.

13. A system as defined in claim 10, wherein:

an additional signal is applied to at least one of the uplink and downlink laser transmitters.

14. A system as defined in claim 10, wherein:

the uplink and downlink laser transmitters are not cooled.

15. A system as defined in claim 10, wherein:

the uplink and downlink laser transmitters are not isolated.

16. A system as defined in claim 10, wherein:

additional traffic is carried at other RF transmission frequencies over the optical fiber.

17. A system as defined in claim 10, wherein:

the CDMA signals are transmitted at the same frequency over the air as on the optical fiber.

18. A system as defined in claim 10, wherein:

the CDMA signals are transmitted at different frequencies over the air and on the fiber, respectively, and the remote antenna unit includes a frequency conversion facility.

19. A system as defined in claim 10, further comprising:

an automatic-gain-control coupled to at least one of the uplink and downlink laser transmitters.

20. A transmission system for carrying CDMA signals between a centralized base station of a wireless communication system and a remote antenna unit, comprising:

an optical fiber connecting the base station and the remote antenna unit;

a downlink laser transmitter in the base station coupled to the fiber for transmitting CDMA signals at an optical wavelength;

a downlink optical receiver in the remote antenna unit coupled to the fiber for receiving CDMA signals at the optical wavelength;

an uplink laser transmitter in the remote antenna unit coupled to the fiber for transmitting CDMA signals at the optical wavelength; and an uplink optical receiver in the base station coupled to the fiber for receiving CDMA signals at the optical wavelength; wherein the RF drive current driving each of the uplink and downlink laser transmitters is maintained above a level, wherein:
one of the uplink and downlink laser transmitters is a Fabry-Perot laser, and
the other one of the uplink and downlink laser transmitters is a single-frequency laser which has a different emission wavelength than the Fabry-Perot laser;
wherein the dynamic range of the transmission system exceeds 36 dB on the uplink from the remote antenna unit to the base station, and exceeds 26 dB on the downlink from the base station to the remote antenna unit.

21. A transmission system for carrying CDMA signals between a centralized base station of a wireless communication system and a remote antenna unit, comprising:
an optical fiber connecting the base station and the remote antenna unit;
a downlink laser transmitter in the base station coupled to the fiber for transmitting CDMA signals at an optical wavelength;
a downlink optical receiver in the remote antenna unit coupled to the fiber for receiving CDMA signals at the optical wavelength;
an uplink laser transmitter in the remote antenna unit coupled to the fiber for transmitting CDMA signals at the optical wavelength; and
an uplink optical receiver in the base station coupled to the fiber for receiving CDMA signals at the optical wavelength; wherein
the RF drive current driving each of the uplink and downlink laser transmitters is maintained above a level, wherein:
the dynamic range of the uplink from the remote antenna unit to the base station exceeds the dynamic range of the downlink from the base station to the remote antenna unit;
wherein the dynamic range of the transmission system exceeds 36 dB on the uplink from the remote antenna unit to the base station, and exceeds 26 dB on the downlink from the base station to the remote antenna unit.

* * * * *

UNITED STATES PATENT AND TRADEMARK OFFICE
CERTIFICATE OF CORRECTION

PATENT NO. : 5,936,754
DATED : August 10, 1999
INVENTOR(S) : ARIYAVISITAKUL, et al.

It is certified that error appears in the above-identified patent and that said Letters Patent is hereby corrected as shown below:

Column 11

Line 30, please change "unlink" to --uplink--.

Column 12

Line 18, please change "unlink" to --uplink--.

Signed and Sealed this

Seventeenth Day of April, 2001

Attest:

NICHOLAS P. GODICI

*Attesting Officer*   *Acting Director of the United States Patent and Trademark Office*